Figure 1:
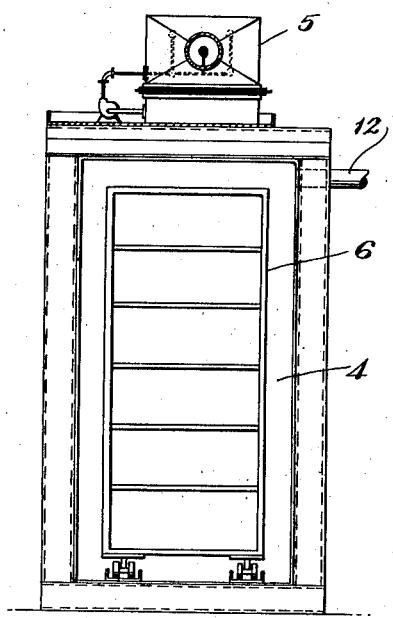

April 19, 1938.  G. R. FENNEMA  2,114,595

METHOD OF COOLING BAKERY PRODUCTS

Filed June 25, 1936

INVENTOR,
Gabe R. Fennema,
BY Lewis J. Doolittle,
ATTORNEY.

Patented Apr. 19, 1938

2,114,595

UNITED STATES PATENT OFFICE 2,114,595

METHOD OF COOLING BAKERY PRODUCTS

Gabe R. Fennema, Baldwin, N. Y.

Application June 25, 1936, Serial No. 87,207

5 Claims. (Cl. 107—54)

This invention relates to a new and improved method for rapidly and efficiently cooling and drying loaves of bread and similar bakery products and also the conditioning of the crust.

In carrying out my improved method I employ a vacuum chamber into which the product is introduced, either having first been left to cool on racks for various time periods and surrounding atmospheric conditions, arriving at the apparatus in varying conditions of temperature and moisture content, or where the product has been properly treated for a fixed time period and arrives at the apparatus with uniform conditions of temperature and moisture content.

In order to better understand the principles and objects of the present invention, I submit the following brief review of my study and tests made in connection with prior methods of bread conditioning.

Thirty years ago it was the usual practice to cool bakery products on racks isolated in a room in which the air was not especially conditioned or maintained at uniform conditions of temperature and moisture, etc. The product was cooled by conduction, evaporation, radiation and convection, requiring several hours time (1 and ½ to 2 hours) and took place under varying conditions of the air, depending on the time of the year, outside weather conditions, temperature, relative humidity, room temperature, ventilation of the room, etc.

When the bread leaves the oven the inside temperature has reached 210 deg. F. in the center, while the average crust temperature is about 240 deg. F., depending on the type of bread and crust. This temperature will drop very rapidly when first removed from the oven and then drop very slowly in the last stage of the cooling process, due to the rapid variation in the difference of the vapor pressure existing in the loaf and that in the surrounding air, which causes rapid evaporation of the moisture within the loaf with resultant loss of heat contained in the loaf.

At the moment the loaf leaves the oven the inside temperature is 210 deg. F. and the vapor pressure is nearly equal to the atmospheric pressure outside. However, condensation will take place very rapidly and although the cells in the bread structure are practically filled with vapor in the last baking stage in the oven air is gradually entering the cells as the cooling process progresses and the cells soon become filled with a saturated air and vapor mixture.

The change in vapor pressure and corresponding temperature from 210 deg. F., at which the vapor pressure is nearly that of atmospheric pressure, drops to 23.46" of mercury at 200 deg. F., to 7.566" at 150 deg. F. to 4.52" at 140 deg. F., to 3.44" at 120 deg. F., to 1.931" at 100 deg. F. and to 1.659" at 95 deg. F. The larger range of variation of vapor pressure in the loaf at the higher temperatures explains the rapid cooling in the early cooling stages. The slight differences of pressure at the lower temperatures accounts for the relatively slow cooling in the last stages and when the vapor pressure inside the product corresponds with that of the surrounding air a point of equilibrium has been reached. Also, it is noted that the radiation of heat from the product is very rapid at 200 deg. F. as compared with that at 100 deg. F. and the convection air currents set up in still air are much stronger at 200 deg. F. than when the crust has reached 100 deg. F. and when the crust temperature has reached the room temperature the inside may be several degrees higher. Cooling by convection has stopped in still air.

The amount of heat transferred by conduction is small at all times but more heat will flow from the product to the supporting rack at 200 deg. F. than at lower temperatures, this heat being dissipated by secondary action of radiation and convection.

The foregoing explains the rapid drop in the first stages of cooling and the relatively slow drop in the final stages.

I have ascertained by actual tests that cooling in a room temperature of 80 deg. F. and 30% relative humidity, the average loaf of bread will cool, inside under the crust as follows:—In ten minutes, from 200 deg. F. to 176 deg. F.; in twenty minutes to 150 deg. F.; in forty minutes to 130 deg. F. and in sixty minutes to 110 deg. F., these temperatures being taken at the center of the loaf. The temperatures directly under the crust being somewhat lower, as would be expected, 164 deg. F. after ten minutes; 140 deg. F. after twenty minutes; 122 deg. F. after forty minutes and 104 deg. F. after sixty minutes.

Various methods of cooling in a vacuum have resulted in shortening the time required but the cooling is effected mainly by the evaporation of the moisture from the product and results in the formation of a hard brittle crust, which is objectionable, rendering the loaf unsuitable for slicing operations, etc. Attempt to avoid this undesirable effect by first partially cooling in the air, as in the former methods, but this requires longer time than is desirable under the present day high-speed requirements. Also, conditions vary with the time of year, atmospheric conditions, etc., resulting in lack of uniformity in results, which is necessary.

Figure 2:
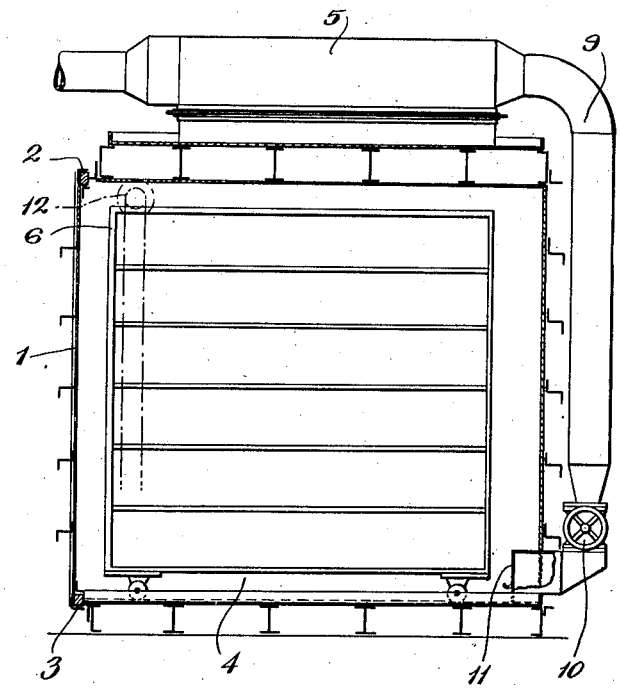
Figure 3:
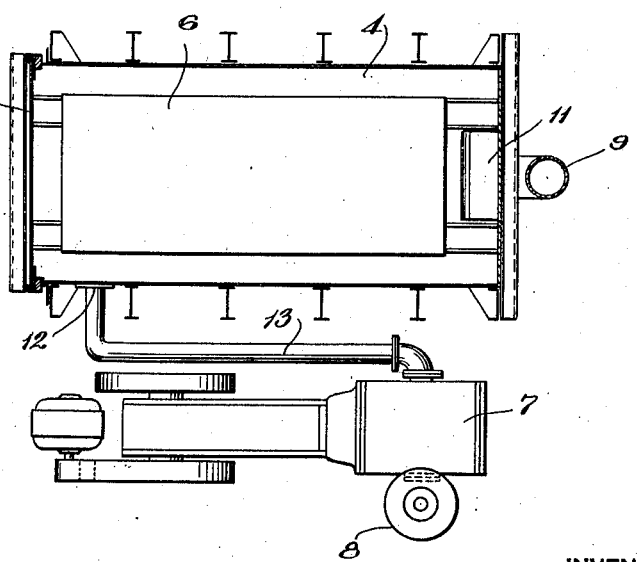

The object of my invention is to provide a rapid and uniform cooling and conditioning of the product and in carrying out my improved method I employ apparatus illustrated in diagrammatic form in the accompanying drawing, in which Fig. 1 is an end view, with the door removed, of one form of apparatus; Fig. 2 is a side elevation of the same and Fig. 3 is a top or plan view thereof.

The apparatus comprises a vacuum chamber, indicated at 4, and which is closed at one end by a door 1 provided with upper and lower fastening means, indicated at 2 and 3, respectively. At 5 is indicated an automatically controlled humidifying and/or dehumidifying device, of standard construction, as will be understood and of which several makes are available on the market. This humidifying-dehumidifying apparatus 5 is connected by a duct 9, through a valve 10, with the lower portion of the vacuum chamber 4 and is provided with baffle plates or deflectors, indicated at 11 at its inner end.

A vacuum pump 7, which may be provided with a silencer 8, of standard construction, is connected by a pipe 13 to an outlet 12 positioned at the upper portion of the vacuum chamber 4.

The bread loaves when removed from the oven are placed on the rack 6 in the room and allowed to cool for as long as may be desirable or the requirements of speed of cooling permit to a temperature as low as the prevailing room temperature and humidity will permit. In order to correct the varying conditions of this preliminary room cooling, the rack is now placed in the vacuum cooling chamber 4, as shown in the drawing, and the door 1 closed. The vacuum pump 7 is started, the valve 10 being first opened to the duct 9 leading to the humidifier 5, drawing air from the outside through the humidifier, leaving the same in a slightly super-saturated condition, through the duct 9, passing valve 10, and baffle deflectors 11, into the bottom of the vacuum chamber 4. This air being cooler and heavier passes upwardly around the loaves on the rack 6, recovering heat from the loaves, and passing out through the opening or outlet 12, through the pipe 13 and pump 7, discharging through the silencer 8, as will be understood. The air drawn from the outside passes through the humidifying-dehumidifying apparatus 5, where it is either cooled or heated to a fixed dew-point or moisture content and temperature. This cool saturated air is released into the vacuum chamber and fills the cells of the product, entering through the crust and thereby cooling the product below the temperature attained in the vacuum. During this part of the operation, the function of the pump 7 is to move the air through the chamber 4 around the loaves and the length of time this is continued depends on the conditions prevailing in the room in which the preliminary drying on the rack took place preliminary to its introduction into the chamber 4, which determine the temperature and moisture content of the loaves before being placed in the chamber 4, as will be understood. The adjustment of the humidifier and the time of continuing the passage of the conditioned air through the chamber is arranged to bring the loaves to a uniform temperature and moisture content condition, or as close thereto as is possible, before starting the second stage of the treatment. The valve 10 is now closed and the vacuum pump 7 now operates to create a partial vacuum in the chamber 4, increasing the rate of cooling for the time necessary to cool the loaves to the desired temperature. When this point has been reached the third stage is started by again opening the valve 10, gradually, to full open position. The cells of the loaf, which have been practically exhausted of air by the second stage of the operation, are again filled, this time with clean, cool, conditioned air from the humidifier 5. In order that the crust texture may be finished in the desired manner, the third stage is finished in the same manner as the first stage was started and the pump 7 stopped and the rack removed from the chamber. The product is subjected to a saturated air current at a temperature lower than that attained in the vacuum and the products are also subjected to a period of crust cooling not obtainable by the vacuum method alone without the loss of excessive moisture. The time period and temperature rise are dependent on the condition of the product when it arrives at the vacuum dryer.

The cooling during the first stage occurs by evaporation, radiation, convection and conduction. The cooling in the second stage is substantially entirely by evaporation and in the third stage first by infusion of cooler saturated air into the cells of the loaves and, secondly, by evaporation, radiation, convection and conduction.

Since some baking plants are provided with efficient rack coolers of the atmospheric type used in room provided with air conditioning units, the loaves on the rack would be of uniform temperature and moisture content and, therefore, in such cases, the first stage of the method above described will have been provided before the racks are placed in the chamber and the second and third stages carried out as described heretofore. The product in this type of conditioning rack coolers is cooled by evaporation, radiation and convection plus conduction. In this latter method, the humidifier-dehumidifier 5 is not necessary, the inlet duct 9 being open to take the conditioned air from the drying room into the drying chamber 4 and the second and third stages of the first method carried out in the same manner as described.

Under normal conditions, with a room temperature of 70 deg. F., the product should be pre-cooled on the rack in the room for about thirty minutes to a temperature of approximately 120 deg. F., and then subjected to the first stage in the apparatus, as heretofore described, for one minute, to the second stage for approximately three minutes and to the third stage for approximately one-half minute.

Under adverse conditions, with a room temperature of 85 deg. F., the product should be pre-cooled in the room for about thirty minutes to a temperature of approximately 150 deg. F., and then subjected to the first stage in the apparatus for three minutes, to the second stage for three minutes and to the third stage for one-half minute.

It will be understood that the time for subjecting the product to the several stages above given will vary with the conditions and the above schedule is given as a general guide for average conditions.

What I claim as new and desire to secure by Letters Patent is:—

1. A method of cooling bakery products which comprises subjecting the products placed in a closed chamber to moving air which has been conditioned to the desired temperature and moisture content and cause a cooling of said products by evaporation of moisture, radiation of heat therefrom by convection and conduction, subjecting the products to a partial vacuum in said chamber to cause further evaporation of the moisture therefrom, and gradually reducing the vacuum in said chamber by admitting cool, saturated air which is infused into the cells of the products, which effects final cooling by evaporation, radiation, convection and conduction to a predetermined and desired temperature and moisture content of the crust and inside portion of the products.

2. A method of cooling bakery products which comprises treating the products in a closed chamber by subjecting to saturated conditioned air at a predetermined temperature lower than that of the products before treatment until the products are brought to a uniform temperature and moisture content condition, and subjecting the products to a partial vacuum to increase the rate of cooling, and then gradually admitting air, preconditioned as to temperature and moisture content, filling the cells of the product previously exhausted of air by the previous step of the process.

3. A method of cooling bakery products which comprises treating the products in a closed chamber by subjecting to saturated conditioned air at a predetermined temperature which is lower than that of the products when placed in said chamber, until the products are brought to a uniform temperature and moisture content condition by radiation, convection, evaporation and conduction, and subjecting the products to a partial vacuum to increase the rate of cooling substantially entirely by evaporation, and then gradually admitting preconditioned air at a temperature substantially lower than that obtained in the vacuum, filling the exhausted cells of the product.

4. A method of cooling bakery products which comprises passing saturated preconditioned air thereover partially cooling the products to a uniform temperature and moisture content condition, subjecting said partially cooled products to a vacuum thereby effecting a further cooling by evaporation to a temperature corresponding to the degree of vacuum employed, and subjecting said products to a final treatment consisting of gradually reducing the vacuum by the admission of clean, cool, saturated air cooler than that obtained in the vacuum and thereby filling the cells of the products previously exhausted of air by the vacuum with said air thus admitted.

5. A method of cooling bakery products which comprises treating the products in a closed chamber by passing saturated preconditioned air thereover partially cooling the products to a uniform temperature and moisture content condition by radiation, convection, evaporation and conduction, discontinuing the passage of said air and subjecting the products to a vacuum and thereby further cooling the same to the temperature obtainable by the degree of vacuum employed, gradually reducing the vacuum by admitting clean, saturated air cooler than that obtained by the vacuum used and filling the cells of the products previously exhausted of air with the said saturated air thus admitted, causing a further cooling of the products by the infusion of said air into the cells.

GABE R. FENNEMA.